G. L. HERZ.
HOSE CLAMP.
APPLICATION FILED APR. 16, 1915.
1,178,071.  Patented Apr. 4, 1916.
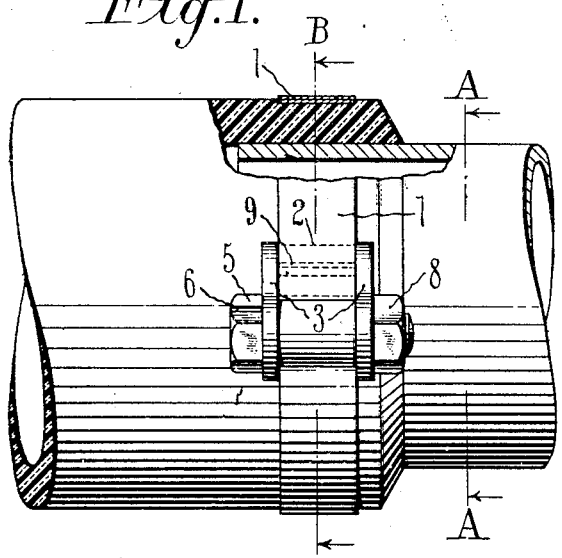
Fig.1.
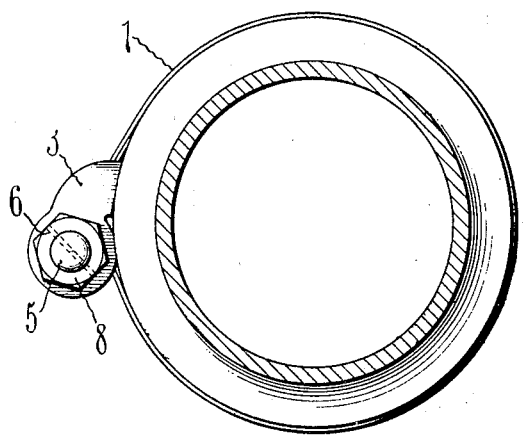
Fig.2.
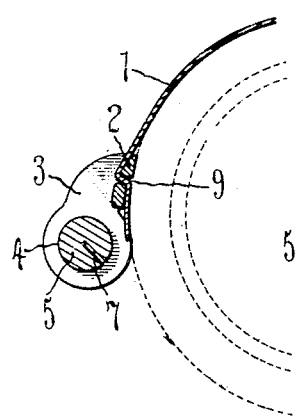
Fig.4.
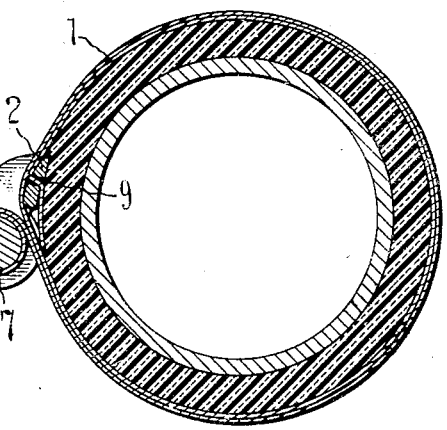
Fig.3.
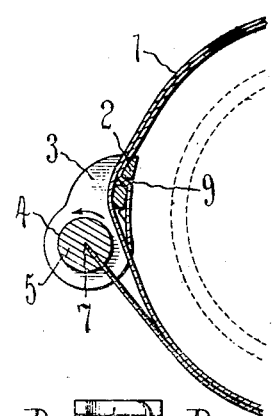
Fig.5.
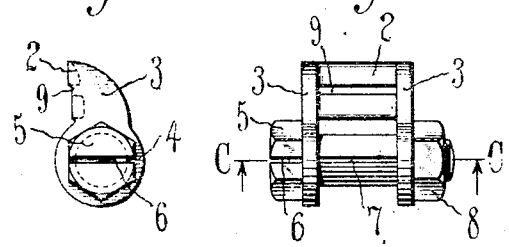
Fig.6. Fig.7. Fig.8. Fig.11.
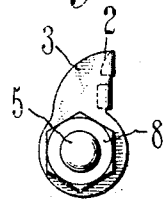
Fig.10.
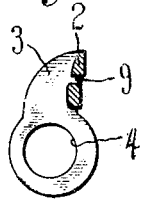
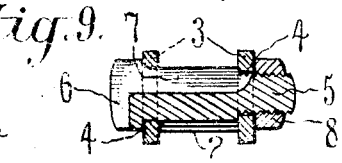
Fig.9.
Witness:
Harry G. Fleischer
Inventor:
Gustav L. Herz
by attorneys

UNITED STATES PATENT OFFICE.

GUSTAVE L. HERZ, OF NEW YORK, N. Y.

HOSE-CLAMP.

1,178,071.  Specification of Letters Patent.  Patented Apr. 4, 1916.

Application filed April 16, 1915. Serial No. 21,653.

*To all whom it may concern:*

Be it known that I, GUSTAVE L. HERZ, a subject of the Emperor of Austria-Hungary, and resident of the borough of Manhattan, in the city and State of New York, have invented a new and useful Hose-Clamp, of which the following is a specification.

One object of my invention is to provide a hose clamp with novel means for tightening an encircling band and locking it in its tightened position.

Another object is to provide a hose clamp having a coupling to which one end of the encircling band is attached and which carries a winding means on which the other end of the band is wound for tightening it.

A further object is to provide a hose clamp in which the winding member is so spaced from the band that the latter may be wound around the hose any desired number of times before tightening it.

Still further objects are to provide a hose clamp having a coupling and means for removably attaching both ends of a band to the coupling and means for tightening the band and locking it in any desired position; to provide in a hose clamp, a coupling independent of the band so that it can be used with a band of any desired length: and to provide a hose clamp which can be simply and efficiently operated and which can be tightened to any desired degree and will withstand great pressure and can be manufactured at a very low cost.

A practical embodiment of my invention is represented in the accompanying drawings, in which, Figure 1 is a side elevation partly in section, of a connection between a hose and a pipe with my hose clamp attached, Fig. 2 is a section taken in the plane of the line A—A of Fig. 1, looking in the direction of the arrows, Fig. 3 is a section taken in the plane of the line B—B of Fig. 1, looking in the direction of the arrows, Fig. 4 is a detail view in section, showing the method of removably locking one end of the band to the coupling. Fig. 5 is a detail view in section, showing the parts in the position which they assume when the band is ready to be tightened, Fig. 6 is a view of one side of the coupling, Fig. 7 is a top plan view of the coupling, Fig. 8 is a view of the other side of the coupling, Fig. 9 is a horizontal section taken in the plane of the line C—C of Fig. 7, looking in the direction of the arrows, Fig. 10 is a view in end elevation of the coupling with the bolt removed, and Fig. 11 is a section taken in the plane of the line D—D of Fig. 10, looking in the direction of the arrows.

The hose clamp comprises a band 1 and a coupling consisting of the slitted back member 2 and the side members 3. The side members 3 have enlarged portions provided with holes 4 adapted to carry the winding bolt 5. This bolt 5 has a kerf 6 in its head which is extended into the body portion of the bolt to form the slot 7, and the other end of the bolt has screw-threads to receive the nut 8. The back member 2 is provided with a transverse slot 9, and the portions of this member adjacent the slot 9, are slightly offset from each other, the outer portion having its upper face beveled.

In operation the band 1 is inserted into the slot 9, as shown in Fig. 4. The offset portions of the back member 8 so distort the band that it will be firmly locked in place against any pull in a direction substantially at right angles to the slot so that when the band is tightened, it will be firmly locked to the coupling but when it is loosened, it can be readily removed therefrom. When the band has been thus locked to the coupling, it may be wound around the hose as many times as desired, the winding bolt 5 being sufficiently spaced from the back member 2 to allow for any desired number of wraps. The free end of the band is then inserted in the slot 7, and the bolt turned to tighten the band to any desired extent, after which the nut 8 is tightened to hold the bolt in this position. The nut 8 is preferably a left handed nut so that the pull on the band automatically tightens the nut. The band 1 may be of any flexible material which is suitable for this purpose. The offset arrangement of the back member and the bevel on its upper portion aid in forming a substantially smooth bearing surface for the coupling so that it will not injure the hose at the point where it is attached.

What I claim is:

A hose clamp comprising a band and a coupling, the said coupling having a pair of side members, a slitted connecting back member so arranged as to distort one end of the band when engaged therewith to removably lock it to the coupling, a kerfed winding bolt rotatably mounted in the side members, the kerf on said bolt being extended into the body of the bolt to form a slot for receiving the other end of the band, and a left handed nut for locking the bolt against rotation.

In testimony, that I claim the foregoing as my invention, I have signed my name this ninth day of April 1915.

GUSTAVE L. HERZ.